(12) United States Patent
Afek et al.

(10) Patent No.: US 10,977,027 B1
(45) Date of Patent: Apr. 13, 2021

(54) SYSTEM AND METHOD OF DEPLOYING JAVA AGENTS IN RUNTIME

(71) Applicant: HCL TECHNOLOGIES LIMITED, Hertzelia (IL)

(72) Inventors: Jonathan Afek, Kfar Saba (IL); Gal Ben-Yair, Givaat Shmuel (IL)

(73) Assignee: HCL TECHNOLOGIES LIMITED, Hertzelia (IL)

( * ) Notice: Subject to any disclaimer, the term of this patent is extended or adjusted under 35 U.S.C. 154(b) by 0 days.

(21) Appl. No.: 16/868,769

(22) Filed: May 7, 2020

(51) Int. Cl.
*G06F 9/44* (2018.01)
*G06F 8/656* (2018.01)
*G06F 9/445* (2018.01)
*G06F 9/4401* (2018.01)

(52) U.S. Cl.
CPC ............ *G06F 8/656* (2018.02); *G06F 9/4401* (2013.01); *G06F 9/44594* (2013.01)

(58) Field of Classification Search
CPC ......................................................... G06F 9/44
See application file for complete search history.

(56) References Cited

U.S. PATENT DOCUMENTS

| 8,707,287 | B2 | 4/2014 | Raundahl Gregersen et al. |
| 10,872,065 | B1 * | 12/2020 | Arrington ............. G06F 16/289 |
| 2003/0093402 | A1 * | 5/2003 | Upton ..................... G06F 9/541 |
| 2004/0153996 | A1 | 8/2004 | Boykin et al. |
| 2005/0005158 | A1 * | 1/2005 | Alaluf ....................... G06F 8/70 726/22 |
| 2009/0164663 | A1 * | 6/2009 | Ransom .................. H04L 45/54 709/243 |
| 2013/0152064 | A1 | 6/2013 | Gagliardi |
| 2014/0059527 | A1 | 2/2014 | Gagliardi |
| 2014/0075422 | A1 | 3/2014 | Rasmussen et al. |

FOREIGN PATENT DOCUMENTS

CN 101763271 B 1/2013

\* cited by examiner

*Primary Examiner* — Jae U Jeon
(74) *Attorney, Agent, or Firm* — Maschoff Brennan

(57) ABSTRACT

The present disclosure relates to system(s) and method(s) for deploying a java agent in runtime. The method creates a .WAR file associated with a java agent. The .WAR file corresponds to a servlet configured to run the java agent. The method further determines an existence of a reference holder class in a bootstrap class loader using the servlet. Based on the determination of the reference holder class, the method connects the servlet to a Java Virtual Machine (JVM). The servlet is connected to the JVM using an open source library. Further, the method deploys the java agent in real-time based on a deployment of a bootstrap class using the servlet. The bootstrap class holds a reference to the java agent. The bootstrap class acts as the reference holder class.

14 Claims, 4 Drawing Sheets

SYSTEM AND METHOD OF DEPLOYING JAVA AGENTS IN RUNTIME

CROSS-REFERENCE TO RELATED APPLICATIONS AND PRIORITY

The present application does not claim priority from any patent application.

TECHNICAL FIELD

The present disclosure in general relates to the field of deployment. More particularly, the present invention relates to a system and method for deploying java agents without requiring restart of the respective JVM.

BACKGROUND

Currently, in order to install the agent, a user must run a web server with an added command line directive "-javaagent <javaagent.jar>". This command tells the JVM to load the jar file before any other application is loaded and allows the agent to manipulate the java bytecode on the fly. This creates an issue whereby, because the agent jar file is loaded during launch time, it is generally not possible to detach or update it during run time. Further, replacing or detaching the jar file requires a restart of the server. It could take a lot of time to restart the server and so reducing this time can be significant.

SUMMARY

Before the present systems and methods for deploying a java agent in runtime, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for deploying the java agent in runtime. This summary is not intended to identify essential features of the claimed subject matter nor is it intended for use in determining or limiting the scope of the claimed subject matter.

In one implementation, a method for deploying a java agent. The method may create a .WAR file associated with a java agent. The .WAR file may correspond to a servlet configured to run the java agent. The method may further determine an existence of a reference holder class in a bootstrap class loader using the servlet. Further, the method may comprise connecting the servlet to a Java Virtual Machine (JVM) based on the determination of the reference holder class. The servlet may be connected to the JVM using an open source library. Furthermore, the method may comprise deploying the java agent in real-time based on a deployment of a bootstrap class using the servlet. The bootstrap class may hold a reference to the java agent. The bootstrap class may act as the reference holder class.

In another implementation, a system for deploying a java agent is illustrated. The system comprises a memory and a processor coupled to the memory, further the processor is configured to execute instructions stored in the memory. In one embodiment, the processor may execute instructions stored in the memory for creating a .WAR file associated with a java agent. The .WAR file may correspond to a servlet configured to run the java agent. The processor may further execute instructions stored in the memory for determining an existence of a reference holder class in a bootstrap class loader using the servlet. Further, the processor may execute instructions stored in the memory for connecting the servlet to a Java Virtual Machine (JVM) based on the determination of the reference holder class. The servlet may be connected to the JVM using an open source library. Furthermore, the processor may execute instructions stored in the memory for deploying the java agent in real-time based on a deployment of a bootstrap class using the servlet. The bootstrap class may hold a reference to the java agent. The bootstrap class may act as the reference holder class.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for deploying a java agent in runtime are now described. The disclosed embodiments of the system and method for deploying the java agent in runtime are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for deploying a java agent in runtime is not intended to be limited to the embodiments illustrated, but is to be accorded the widest scope consistent with the principles and features described herein.

In one embodiment, a method for deploying a java agent in runtime is illustrated. A .WAR file associated with a java agent may be created. The .WAR file may correspond to a servlet configured to run the java agent. Further, an existence of a reference holder class in a bootstrap class loader may be determined. The existence of the reference holder class may be determined using the servlet. The servlet may be connected to a Java Virtual Machine (JVM) based on the determination of the reference holder class. The servlet may be connected to the JVM using an open source library. Based on the connection, the java agent may be deployed in real-time based on a deployment of a bootstrap class using the servlet. The bootstrap class may hold a reference to the java agent. The bootstrap class may act as the reference holder class.

Figure 1:
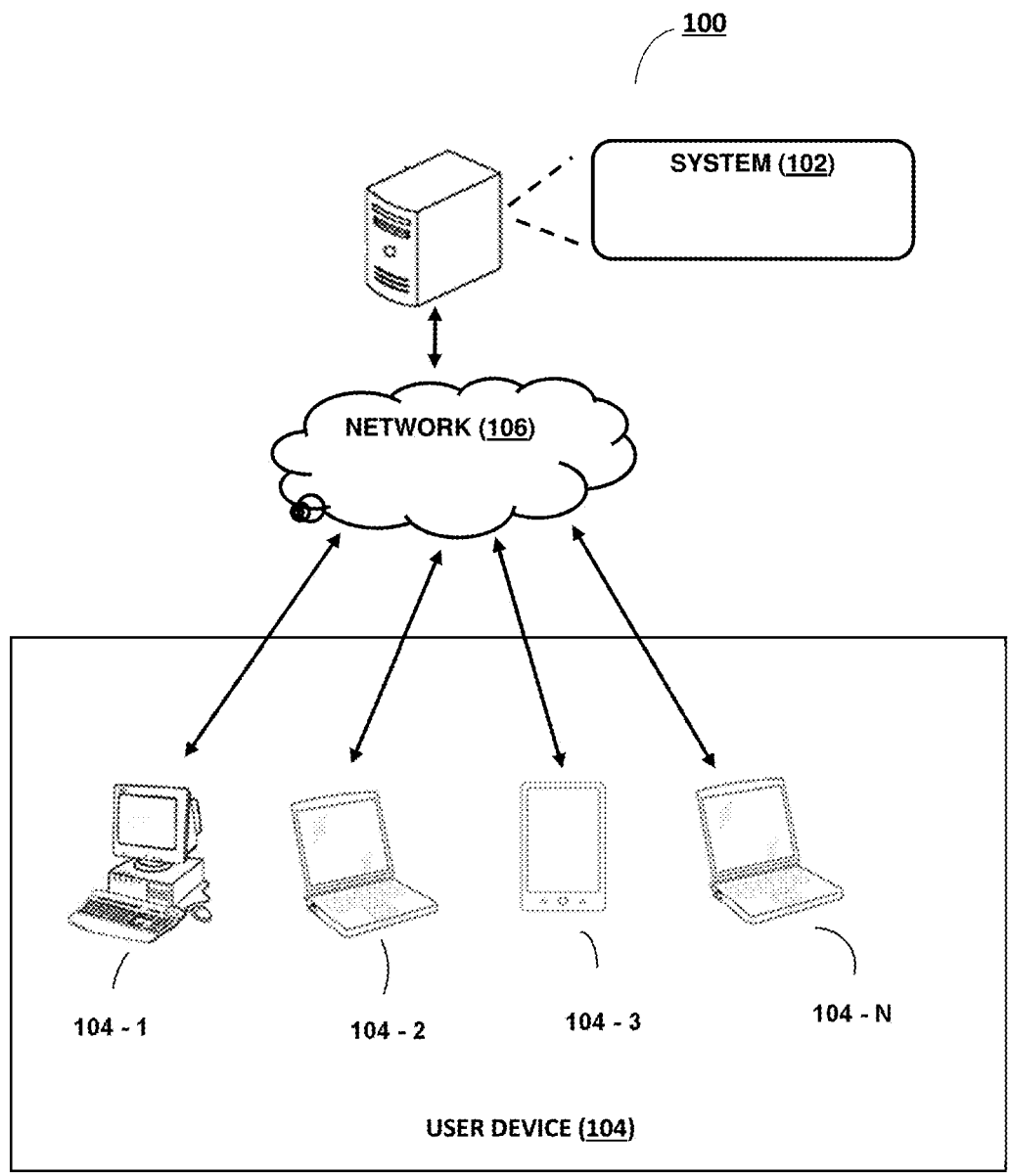
FIG. 1 illustrates a network implementation of a system for deploying a java agent in runtime, in accordance with an embodiment of the present subject matter.

Referring now to FIG. 1, a network implementation 100 of a system 102 for deploying a java agent in runtime is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
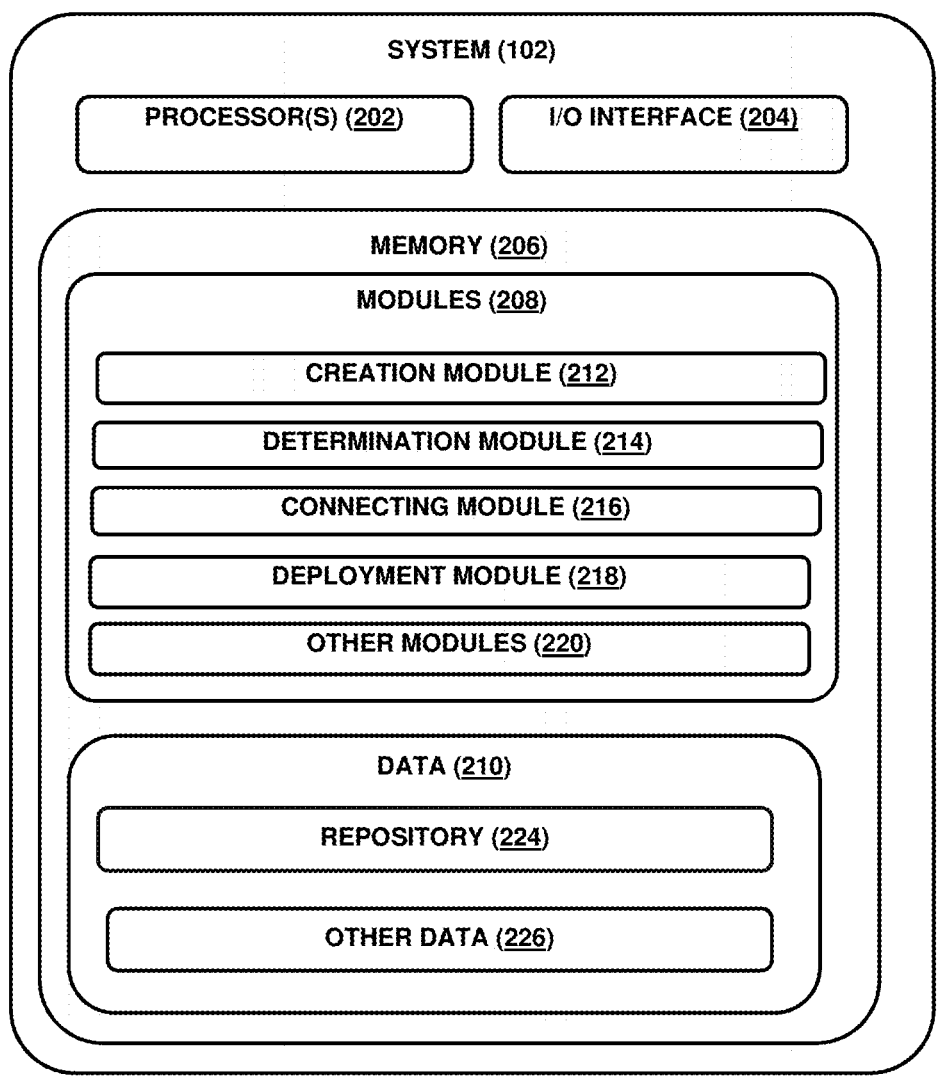
FIG. 2 illustrates the system for deploying the java agent in runtime, in accordance with an embodiment of the present subject matter.

Referring now to FIG. 2, the system 102 for deploying a java agent in runtime is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a creation module 212, a determination module 214, a connecting module 216, a deployment module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 224, and other data 226. In one embodiment, the other data 226 may include data generated as a result of the execution of one or more modules in the other modules 222.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the creation module 212 may create a .WAR file associated with a java agent. The .WAR fie may be deployed onto a web server. The .WAR file may correspond to a servlet. The web server may be configured to initialize the servlet. Based on the initialisation, the servlet may be configured to run a code associated with the java agent.

Further, the determination module 214 may determine an existence of a reference holder class in a bootstrap class loader. In one aspect, the servlet may determine the existence of the reference holder class in the bootstrap class loader. The determination of the existence may correspond to checking the reference holder class in the bootstrap class loader.

In one embodiment, the reference holder class may exist in the bootstrap class loader. In the embodiment, the determination module 214 may determine if the reference holder class holds a valid agent. The valid agent may be referred as an existing agent. If the reference holder class holds the existing agent, then the determination module 214 may be configured to unload the existing agent. Further, the determination module 214 may be configured to de-transform one or more loaded classes transformed by the existing agent. The determination module 214 may use the servlet to de-transform the one or more loaded classed.

During unloading, the servlet may check the bootstrap class loader to determine the existence of the reference holder class. Further, the servlet may check if the reference holder class holds a reference to the existing agent. The existing agent may be referred as a previous agent. If the reference holder class holds the existing agent, then the servlet may de-transform the one or more classes transformed by the existing agent. Furthermore, the servlet may dereference the old agent from the reference holder class In another embodiment, the reference holder class may not exist in the bootstrap class holder. In the embodiment, the determination module 214 may load the reference holder class in the bootstrap class holder.

Further, the connecting module 216 may be configured to connect the servlet to a Java Virtual Machine (JVM). The servlet may be connected to the JVM using an open source library. In one example, the open source library such as ByteBuddy may be used. Using this open source library, it may be possible to attach an agent to an already running JVM and transform loaded classes to the required byte code.

Based on the connection, the deployment module 218 may deploy a bootstrap class using the servlet. Upon deployment of the bootstrap class, the deployment module 218 may deploy the java agent in real time. The bootstrap class may further act as the reference holder class for the java agent. The bootstrap class may be configured to store information associated with the java agent. In other words, the bootstrap class may act as the reference holder to agent transformation objects associated with the java agent.

Upon deployment, the servlet may be configured to transform the one or more loaded classes and new classes based on behaviour of the java agent.

In one embodiment, the information, associated with the java agent, stored in the reference holder class may be updated. The updating of the information may comprise creating a new .WAR file associated with the java agent. The new .WAR file may be further configured to replace the servlet associated with the .WAR file. In one aspect, the web server may unload the servlet and load the new .WAR file as a new servlet. The web server may further initialize the new servlet. Further, information, associated with the java agent, in the new servlet may be stored in the reference holder class. Based on this, the information of the java agent may be updated.

In one embodiment, the java agent may be unloaded. The unloading of the java agent may comprise de-referencing the reference holder class from the java agent using the servlet. The java agent may be unloaded either when a loading agent detects a previous agent that has not been unloaded or during the unloading of the servlet that originally loaded the agent by the web server.

Exemplary embodiments discussed above may provide certain advantages. Though not required to practice aspects of the disclosure, these advantages may include those provided by the following features.

Some embodiments of the system and the method is configured to load and unload a java agent in real-time.

Some embodiments of the system and the method is configured to load and unload the java agents without restarting of the respective JVM.

Figure 3:
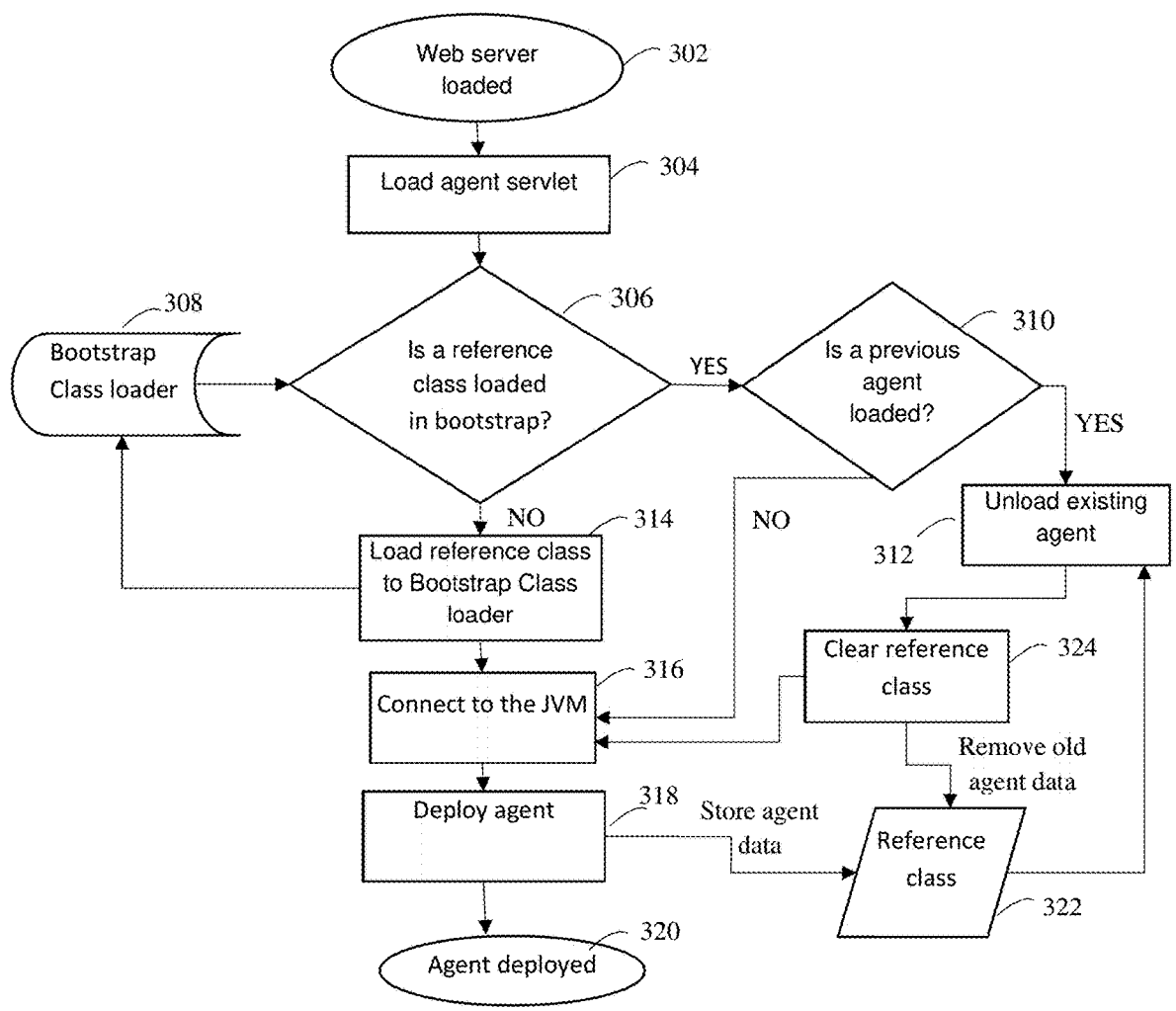
FIG. 3 illustrates a method for deploying a java agent in runtime, in accordance with an embodiment of the present subject matter.

Referring now to FIG. 3, a method for deploying a java agent, is disclosed in accordance with an embodiment of the present subject matter. The method may be described in the general context of computer executable instructions. Generally, computer executable instructions can include routines, programs, objects, components, data structures, procedures, modules, functions, and the like, that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system 102.

At block 302, a .war file associated with a java agent may be created. In one implementation, the creation module 212 may create the .war file. The .war file may correspond to a servlet. Further, the .war file may be deployed by a web server. At block 304, the web server may initialize the servlet.

At block 306, an existence of a reference holder class in a bootstrap class loader 308 may be determined. In one implementation, the determination module 214 may determine the existence of the reference holder class. If the reference holder class exists in the bootstrap class loader, then the determination module 214 may determine if the reference holder class holds a reference to an existing agent, at block 310. If the existing agent exists in the reference holder class, then the existing agent maybe unloaded at block 312. Further, at block 324, the reference holder class may be cleared based on unloading of the existing agent. Furthermore, data associated with the existing agent or an old agent may be removed from the reference class 322.

If the reference holder class is not available in the bootstrap class loader, then, at block 314, the reference holder class may be loaded into the bootstrap class loader 308.

Further, at block 316, the servlet may be connected to a Java Virtual Machine (JVM). The servlet may be connected to the JVM using an open source software. In one aspect, if the existing agent does not exist in the reference holder class at block 310, then the servlet may be connected to the JVM.

Further, at block 318, the java agent may be deployed. Furthermore, information associated with the java agent may be stored in the reference holder class 322. At block 320, the java agent may be deployed, and the servlet may transform one or more loaded classes and new classes based on requirements of the java agent.

Figure 4:
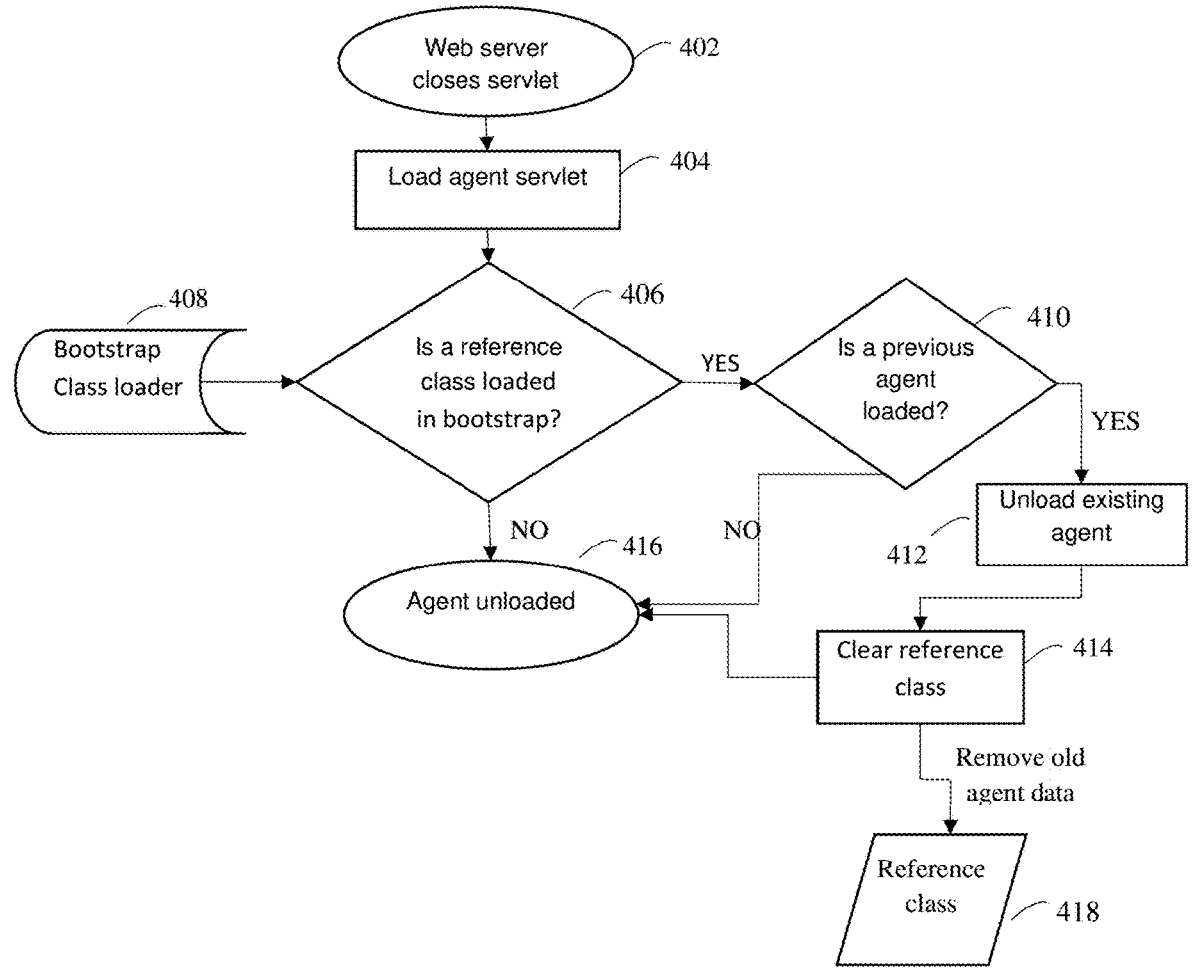
FIG. 4 illustrates a method for unloading the java agent, in accordance with an embodiment of the present subject matter.

Referring now to FIG. 4, a method for unloading the java agent, is disclosed in accordance with an embodiment of the present subject matter. In one embodiment, the java agent may be unloaded either when a loading agent detects a previous agent that has not been unloaded or during the unloading of the servlet that originally loaded the agent by the web server. At block 402, a web server closes a servlet associated with the java agent 404. At block 406, the servlet may check the bootstrap class loader 408 to see whether the reference holder class exists. If the reference holder class exists in the bootstrap class loaded, then at block 410, the servlet may check if the reference holder class holds a valid reference to the java agent. The java agent may be an existing java agent in this case. Further, if the reference holder class holds the java agent, then at bock 412 the java agent may be unloaded. The java agent may be unloaded based on de-referencing the java agent from the reference holder class. At block 416, the java agent may be unloaded.

Based on unloading, the reference class 418 may be cleared at the block 414. The servlet may de-transforms one or more classes as transformed by the loaded agent or the java agent.

If the reference holder class is not available in the bootstrap class loader, then the java agent may be unloaded already.

Further, if the reference holder class does not hold the reference for the java agent, then the java agent may be already unloaded.

Although implementations for systems and methods for deploying a java agent have been described, it is to be understood that the appended claims are not necessarily limited to the specific features or methods described. Rather, the specific features and methods are disclosed as examples of implementations for deploying the java agent.

The invention claimed is:

1. A method for deploying a java agent, the method comprises:
   creating, by a processor, a .WAR file associated with a java agent, wherein the .WAR file corresponds to a servlet configured to run the java agent;
   determining, by the processor, an existence of a reference holder class in a bootstrap class loader using the servlet;
   connecting, by the processor, the servlet to a Java Virtual Machine (JVM) based on the determination of the reference holder class, wherein the servlet is connected to the JVM using an open source library; and
   deploying, by the processor, the java agent in real-time based on a deployment of a bootstrap class using the servlet, wherein the bootstrap class holds a reference to the java agent, and wherein the bootstrap class acts as the reference holder class.

2. The method as claimed in claim 1, further comprises unloading an existing agent from the reference holder class when the existing agent is available in the reference holder.

3. The method as claimed in claim 1, wherein the servlet is configured to de transform one or more loaded classes transformed by the existing agent.

4. The method as claimed in claim 1, further comprises transforming the one or more loaded classes and new classes based on a behaviour of the java agent.

5. The method as claimed in claim 1, further comprises updating information associated with java agent stored in the reference holder class, wherein the information is updated based on creating a new .WAR file associated with the java agent.

6. The method as claimed in claim 1, further comprises loading the reference holder class into the bootstrap class, when the reference holder class is not available in the bootstrap class.

7. The method as claimed in claim 1, further comprises un-loading the java agent based on de-referencing the reference holder class from the java agent using the servlet.

8. A system for deploying a java agent, the system comprises:
   a memory;
   a processor coupled to the memory, wherein the processor is configured to execute instructions stored in the memory to:
      create a .WAR file associated with a java agent, wherein the .WAR file corresponds to a servlet configured to run the java agent;
      determine an existence of a reference holder class in a bootstrap class loader using the servlet;
      connect the servlet to a Java Virtual Machine (JVM) based on the determination of the reference holder class, wherein the servlet is connected to the JVM using an open source library; and
      deploy the java agent in real-time based on a deployment of a bootstrap class using the servlet, wherein the bootstrap class holds a reference to the java agent, and wherein the bootstrap class acts as the reference holder class.

9. The system as claimed in claim 8, further configured to unload an existing agent from the reference holder class when the existing agent is available in the reference holder.

10. The system as claimed in claim 8, wherein the servlet is configured to de transform one or more loaded classes transformed by the existing agent.

11. The system as claimed in claim 8, further configured to transform the one or more loaded classes and new classes based on a behaviour of the java agent.

12. The system as claimed in claim 8, further configured to update information associated with java agent stored in the reference holder class, wherein the information is updated based on creating a new .WAR file associated with the java agent.

13. The system as claimed in claim 8, further configured to load the reference holder class into the bootstrap class, when the reference holder class is not available in the bootstrap class.

14. The system as claimed in claim 8, further configured to un-load the java agent based on de-referencing the reference holder class from the java agent using the servlet.

\* \* \* \* \*